(12) United States Patent
Reed et al.

(10) Patent No.: US 7,352,878 B2
(45) Date of Patent: Apr. 1, 2008

(54) HUMAN PERCEPTUAL MODEL APPLIED TO RENDERING OF WATERMARKED SIGNALS

(75) Inventors: Alastair M. Reed, Lake Oswego, OR (US); Eliot Rogers, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 592 days.

(21) Appl. No.: 10/826,970

(22) Filed: Apr. 15, 2004

(65) Prior Publication Data

US 2005/0157907 A1    Jul. 21, 2005

Related U.S. Application Data

(60) Provisional application No. 60/480,993, filed on Jun. 23, 2003, provisional application No. 60/463,175, filed on Apr. 15, 2003.

(51) Int. Cl.
*G06K 9/00* (2006.01)

(52) U.S. Cl. ..................................... 382/100

(58) Field of Classification Search ..................... None
See application file for complete search history.

(56) References Cited

U.S. PATENT DOCUMENTS

| | | | |
|---|---|---|---|
| 5,748,763 A | 5/1998 | Rhoads | |
| 6,614,914 B1 | 9/2003 | Rhoads et al. | |
| 6,700,995 B2 | 3/2004 | Reed | |
| 6,738,495 B2 | 5/2004 | Rhoads et al. | |
| 7,006,662 B2 | 2/2006 | Alattar et al. | |
| 7,263,203 B2 | 8/2007 | Rhoads et al. | |
| 2001/0054150 A1* | 12/2001 | Levy ........................ 713/176 |
| 2002/0051560 A1 | 5/2002 | Donescu et al. | |
| 2002/0090111 A1 | 7/2002 | Fukushima et al. | |
| 2004/0184369 A1 | 9/2004 | Herre et al. | |
| 2005/0134918 A1 | 6/2005 | Reed | |
| 2006/0039581 A1 | 2/2006 | Decker et al. | |
| 2007/0031000 A1 | 2/2007 | Rhoads et al. | |
| 2007/0053550 A1 | 3/2007 | Alattar et al. | |

FOREIGN PATENT DOCUMENTS

EP    1220152    7/2002

OTHER PUBLICATIONS

U.S. Appl. No. 60/463,175, filed Apr. 15, 2003.
U.S. Appl. No. 11/846,449, filed Aug. 28, 2007.

* cited by examiner

*Primary Examiner*—Brian Werner
*Assistant Examiner*—Elisa M Rice

(57) ABSTRACT

A digital watermarking system uses a model of a rendering device to take into account the impact of the rendering device on visual or auditory quality of the watermarked signal. For visual content, a reference image and watermarked image are passed through the model and then supplied to a visual quality metric that assesses the visibility of the watermark. The digital watermark embedding is adjusted iteratively with each pass through this process to produce a watermarked signal that has the desired visual quality.

16 Claims, 3 Drawing Sheets

HUMAN PERCEPTUAL MODEL APPLIED TO RENDERING OF WATERMARKED SIGNALS

RELATED APPLICATION DATA

This application claims the benefit of U.S. Provisional Patent Application Nos. 60/480,993, filed Jun. 23, 2003, and 60/463,175, filed Apr. 15, 2003, which are hereby incorporated by reference.

TECHNICAL FIELD

The invention relates to digital watermarking of visual and audio data.

BACKGROUND AND SUMMARY

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 6,614,914 and 6,122,403, which are hereby incorporated by reference.

One challenge for watermarking visual media is maximizing the robustness, readability, and/or auxiliary information capacity of a digital watermark relative to a desired perceptual quality level. The digital watermark modifies the host image to embed auxiliary data, yet makes these changes using the assistance of human visual system modeling such that the changes are substantially imperceptible. While many have discussed perceptual image models that address this issue, several challenges remain, including effectively extending models beyond just luminance to address human perceptual models for colors, (and addressing the impact of printing to the perceptual model.

This disclosure describes a method for digitally watermarking visual media taking into account a model of the rendering device, such as the printer or video display, to account for the effect of the rendering device on visibility of the digital watermark. In one implementation, a reference image and watermarked image are passed through a model of the rendering device and then to a perceptual quality metric to compute a visibility metric for the watermarked image relative to the reference. The digital watermarking process repeats this evaluation iteratively, while adjusting the embedding of the digital watermark to achieve a desired visual quality.

In the case where the rendering device is a printer, the model of the output device takes into account such effects as the blurring effect, the tonal compression effect, and/or the dot gain effect of the printing process for a particular printer and substrate on which the image is printed. A similar approach can be applied to display devices, such as video monitors, video projectors, high definition video monitors, Plasma displays, etc. to take into account a model of the rendering device. As such, the method applies to still images and video content.

The technique can also be applied to watermarked audio, where the rendering device produces audio output and the system includes a model of the rendering device as well as an audio quality metric.

In our implementation, we use the Watson metric as a visual quality metric, but other metrics may be used as well.

Further features will become apparent with reference to the following detailed description and accompanying drawings.

DETAILED DESCRIPTION

Introduction

Figure 1:
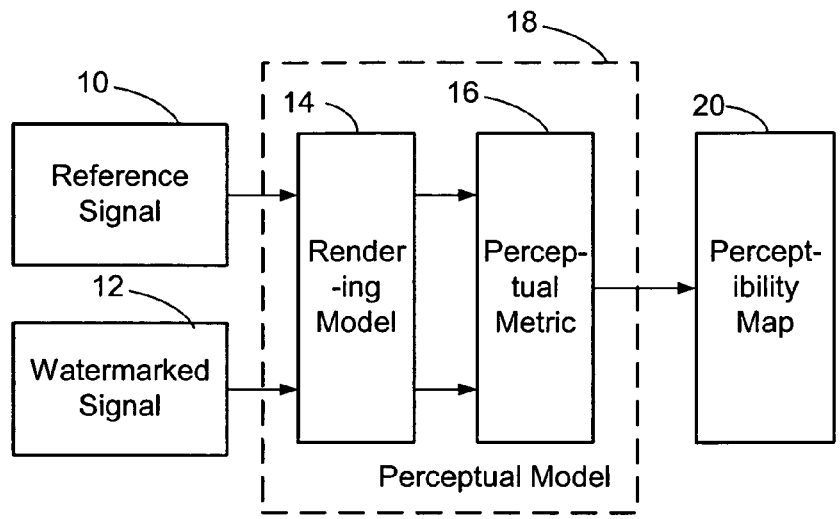
FIG. 1 is a diagram of a perceptual model used in a watermark embedder to compensate for the effect of the rendering device on perceptibility of a digital watermark.

We have developed a system for embedding digital watermarks in media content while taking into account the impact of the rendering device on the perceptibility of the watermark in output produced by that device. FIG. 1 is a diagram of a perceptual model used in a watermark embedder to compensate for the effect of the rendering device on perceptibility of a digital watermark. The perceptual model 18 receives reference and watermarked signals 10, 12. It then models the effect of the rendering device in a rendering model module 14. A perceptual metric module 16 then computes a perceptibility map 20 that is used to adjust the digital watermark selectively in areas of the watermarked signal that can tolerate more or less watermark signal strength for a desired amount of perceptibility. For example, the watermark signal strength can be maximized across the watermarked signal by varying it to maintain a desired perceptibility level as measured with the perceptibility metric.

In the following description, we focus on visual content and rendering of such content through printers or displays.

Similar approaches can be used for audio content using human auditory system models and models of the rendering device (e.g., D/A conversion and speakers) to compensate for the effect of the rendering device on the perceptibility of the watermark.

Color Image Model for Rendering of Watermarked Visual Content

Perceptual models have been applied to the watermarking of still images. Many of these methods use luminance based models that do not take into account the reduced sensitivity of the eye to high spatial frequencies in the blue-yellow and red-green directions. Most of the models also ignore the effect of the output process on image quality. For example, in offset printing the same digital image will appear very different if it is printed on newsprint with a 85 line screen ruling, compared to printing on high quality gloss paper with a 150 line screen ruling. Similarly images and video appear different if rendered on different display devices such as projectors, televisions, computer monitors, etc. with different display formats and parameters.

To illustrate our method for offset printing, we describe a color image appearance model for Standard Web Offset Printing (SWOP) cyan, magenta, yellow, black (CMYK) data that is being watermarked. This model is used to calculate a grayscale visibility difference map. The visibility difference map is used to equalize the visibility of the watermark across the image, resulting in the maximum watermark signal at any visibility level.

This implementation of the color image appearance model is based on the Spatial CieLab and Watson metric, together with a model of the offset print process that is applied to the input images. Many factors affect the image quality of offset printed images. The major factors in offset printing that affect the watermark visibility are the paper stock and screen ruling. The model is used to automatically obtain the required visibility level for a watermark on characterized paper stocks and screen rulings.

Figure 2:
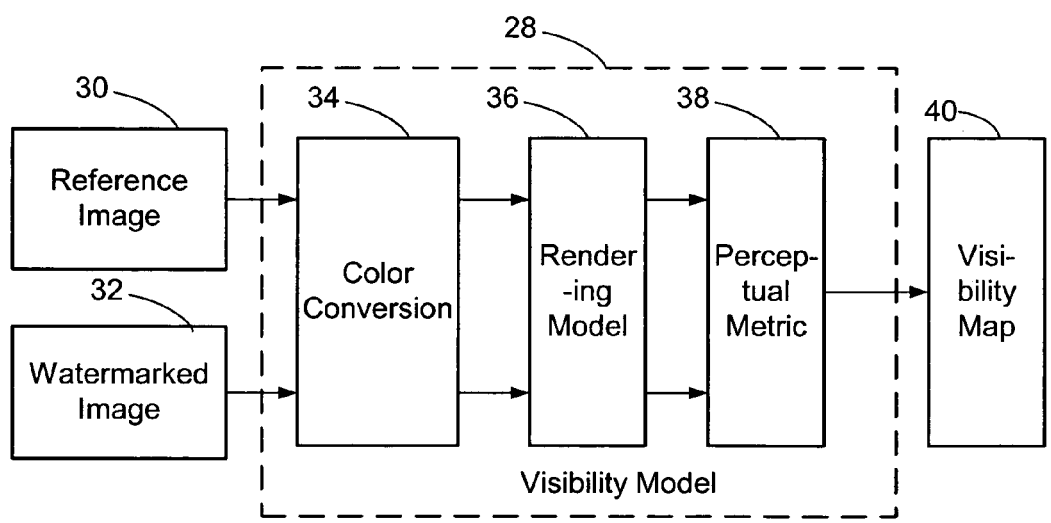
FIG. 2 is a diagram of a visibility model used in a watermark embedder to compensate for the effect of a printer on the perceptibility of a digital watermark.

FIG. 2 is a diagram of a visibility model used in a watermark embedder to compensate for the effect of a printing process on the perceptibility of a digital watermark. The visibility model 28 takes as input reference and watermarked images 30 and 32 and produces a visibility map used to adjust the watermarked image. The visibility model has three main components: color conversion module 34 (e.g., Spatial CieLab conversion) for converting the input images to a format for visibility analysis, a rendering device model 36 for modeling the effect of the rendering device, and a visibility metric module 38 (e.g., Watson metric) for computing a visibility metric for areas within the input images.

In one implementation, the reference and watermarked images 30, 32 are passed through a Spatial CieLab conversion going from CMYK to luminance. For more information on Spatial CieLab conversion, see Xuemei Zhang and Brian A. Wandell, 'A Spatial Extension of CieLab for Digital Color Image Reproduction', Proceedings of the SID Symposiums (1996). Alternative color conversion modules may be used. Also, if the visibility metric operates on color images, the input color images are converted to the color format used in the visibility metric module. For example, if the images are in CMYK format, they are converted to RGB format for a visibility metric module that operates on images in RGB format.

In the case of offset printing, the luminance images are passed through an offset print model to correct for paper type and screen ruling, and the two images are then compared in the Watson metric to produce an output visibility display map as a grayscale image. For more information on the Watson metric, see U.S. Pat. No. 5,629,780, which is hereby incorporated by reference.

The color image appearance model can be used iteratively within the watermark embedding software to obtain a marked image with the required level of visibility, on different types of print media from high quality offset on a heavy gloss paper stock to newsprint. The process of embedding a watermark in a CMYK image for print makes use of an original image along with a grayscale mask. Iterative embedding extends this by using the visibility map produced with the color image appearance model to create a new mask after each embedding iteration, as shown in FIG. 3.

Figure 3:
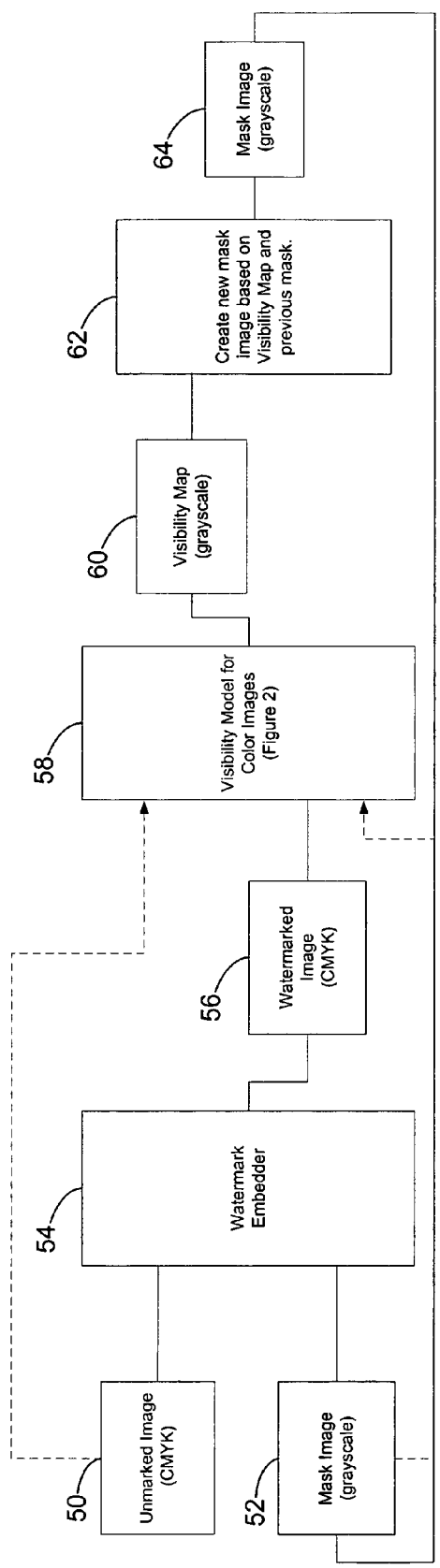
FIG. 3 is a diagram of an iterative embedding process using a visibility model that compensates for rendering effects to adjust the embedding strength in iterations of the embedding process.

FIG. 3 is a diagram of an iterative embedding process using a visibility model that compensates for rendering effects to adjust the embedding strength in iterations of the embedding process. The embedder 54 receives as input an original image 50 and a mask 52 used to control embedding strength in corresponding areas of the original image. It produces a watermarked image 56. As explained above, the visibility model 58 uses the original un-marked image 50 and the watermarked image 56 to produce a visibility map 60.

In the iterative process, areas of the mask are adjusted up and down based on the visibility map and the previous mask to change the amount of watermark signal being embedded in different parts of the image as shown in block 62 of FIG. 3. The new mask 64 is then fed back into the embedder 54 for the next embed. This continues until a visibility "goal" is reached, and the visibility map shows an even level of difference across the entire image.

The embedding software automatically determines the maximum watermark signal level that can be inserted while achieving the required visibility on these different media. The signal level is also adjusted to compensate for the different types of image content, and the effect of watermark resolution.

Figure 4:
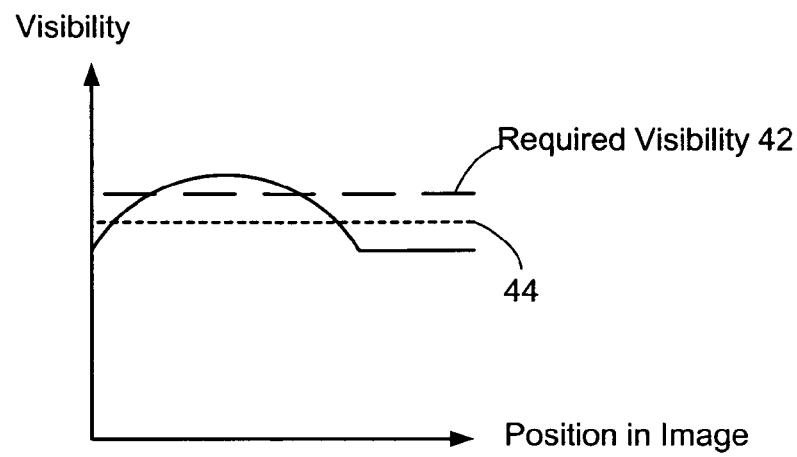
FIG. 4 is a plot illustrating an example of spatial visibility distribution used to illustrate how a visibility map can be used to adjust the strength of a digital watermark in areas of an image.

The model described above was used to calculate the visibility of a watermark added to an image. The visibility display map was used to iteratively adjust the watermark strength, until the required level of visibility was achieved across the whole image (see FIG. 3). This allows the maximum watermark signal strength for a given level of visibility to be inserted. If the visibility is not approximately constant across an image, the watermark strength will be limited to the strength at which one area of the image first exceeds the required visibility level (see FIG. 4, line 42). Less watermark signal is added in this case than if the visibility is approximately constant (see FIG. 4, dotted line 44).

Figure 5:
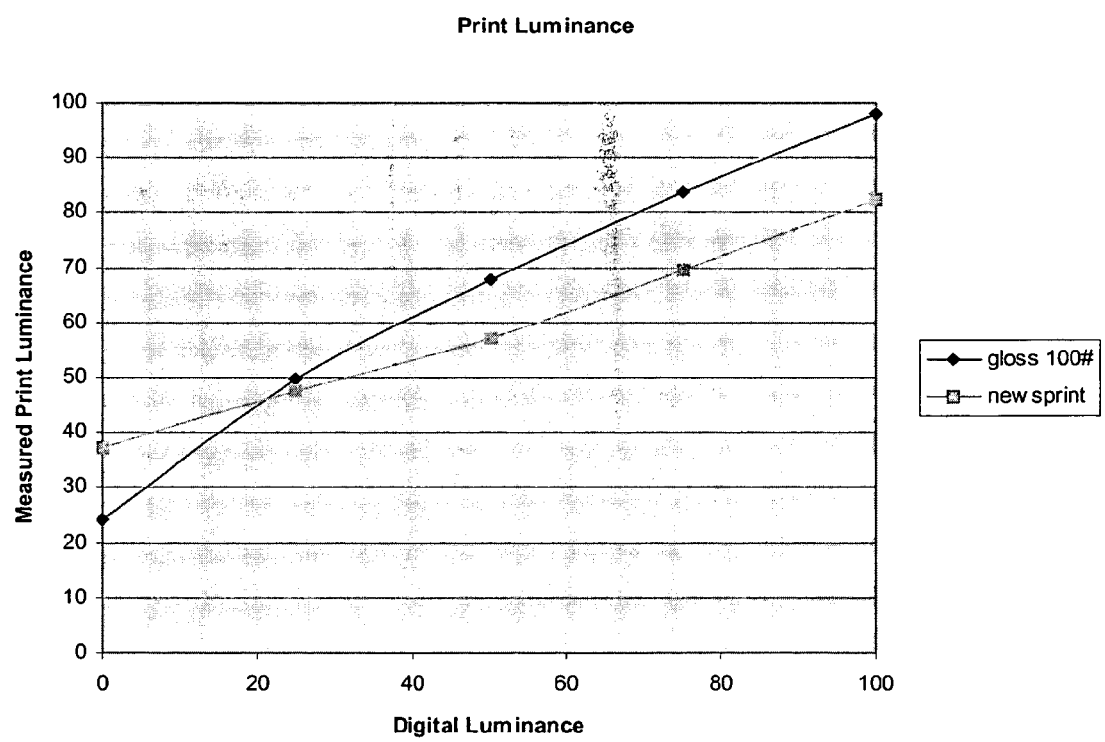
FIG. 5 is a plot illustrating measured print luminance vs. digital luminance for different rendering processes, namely printing on gloss paper vs. printing on newsprint.

The same model was used to calculate the visibility of a watermark (strength 1) added to an image which was then output to 100 pound gloss paper with a 150 line screen, compared to the same image output to newsprint with an 85 line screen. The visibility of the added watermark was predicted to be about 50% on the newsprint than on the 100 pound gloss paper. The paper stock has a large effect on the perceived image quality, due to the different tonal range and spatial resolution of the different paper stocks. The difference in tonal range for the different paper stock is shown in FIG. 5.

The appearance model was used to calculate the watermark signal level (strength 2) required to obtain approximately the same visibility on newsprint. The difference between the strength 2 watermarked image and reference image on newsprint was subjectively about the same, as the difference between the strength 1 watermarked image and the reference image printed on 100 pound gloss paper.

The color image appearance model we described has been used to obtain approximately equal watermark visibility across an image. The watermark signal strength has been corrected for images output on different types of paper stock, to obtain approximately the same visibility.

Controlling the watermark signal strength with this model, allows a more consistent signal level to be added to the image which takes into account the following factors:

a) image content b) signal loss due to the paper stock and screen ruling.

The model we have described can be altered for other physical output processes such as screen display by replacing the 'Offset Print Model' component with a 'Screen Display Model'. Further, an attention model could also be used to determine areas within an image where a viewer's attention is most likely to be drawn. The results of the attention model can be used to generate a map indicating areas to adjust the watermark strength up or down to allow a stronger watermark signal to be placed in the areas where the viewer's attention is less likely drawn, such as background regions of an image.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method of digitally watermarking visual media comprising:

passing a reference image and a watermarked image through a model of an output device to produce a modeled reference image and a modeled watermarked image, the reference image comprising a version of the watermarked image prior to being watermarked to form the watermarked image;

passing the modeled reference image and the modeled watermarked image to a visual quality metric that computes a measure of visual quality of the modeled watermarked image based on a visual quality analysis of the modeled watermarked image relative to the modeled reference image; and using the output of the quality metric to adjust watermark embedding to achieve a desired visual quality in a watermarked image.

2. The method of claim 1 wherein the visual media comprises an image to be printed and the model is a model of a printing process.

3. The method of claim 1 wherein the visual media comprises video to be displayed and the model is a model of a display device.

4. The method of claim 1 including:

applying the model of the output device and visual quality metric iteratively to adjust the watermark embedding.

5. The method of claim 1 wherein the visual quality metric is used to produce a visibility map, and the visibility map is input to the watermark embedding to adjust areas of the digital watermark so as to compensate for an effect of the output device on visual quality of the watermarked image.

6. The method of claim 1 wherein the visual quality metric evaluates a watermarked image relative to an original un-watermarked image to identify areas in the watermarked image where an embedded digital watermark is more or less visible.

7. A computer readable storage medium on which is stored instructions for performing a method of digitally watermarking visual media, the method comprising:

passing a reference image and a watermarked image through a model of an output device to produce a modeled reference image and a modeled watermarked image, the reference image comprising a version of the watermarked image prior to being watermarked to form the watermarked image;

passing the modeled reference image and the modeled watermarked image to a visual quality metric that computes a measure of visual quality of the modeled watermarked image based on a visual quality analysis of the modeled watermarked image relative to the modeled reference image; and using the output of the quality metric to adjust watermark embedding to achieve a desired visual quality in a watermarked image.

8. A method of digitally watermarking a signal comprising:

passing a reference signal and a watermarked signal through a model of an output device to produce a modeled reference signal and a modeled watermarked signal, the reference signal comprising a version of the watermarked signal prior to being watermarked to form the watermarked signal;

passing the modeled reference signal and the modeled watermarked signal to a perceptual quality metric that computes a measure of perceptual quality of the modeled watermarked signal based on a perceptual quality analysis of the modeled watermarked signal relative to the modeled reference signal; and using the output of the quality metric to adjust watermark embedding to achieve a desired perceptual quality in a watermarked signal.

9. The method of claim 8 wherein the model of the output device models an effect of an audio rendering process.

10. The method of claim 8 wherein the model of the output device models an effect of a video rendering process.

11. The method of claim 8 wherein the model of the output device models an effect of a printing process.

12. The method of claim 8 wherein the output of the quality metric is used to adjust strength of digital watermark embedding in areas of the watermarked signal where the perceptual quality metric determines that a digital watermark is more or less perceptible than desired.

13. The method of claim 12 wherein the adjusting is performed by providing output from the quality metric to input of a digital watermark embedding process.

14. The method of claim 13 including providing output from the quality metric to the digital watermark embedding process in a visibility map used to adjust strength of digital watermark embedding in areas of the signal.

15. The method of claim 12 wherein the adjusting is performed iteratively by repeatedly applying the model of the output device and the quality metric to watermarked signals and using output of the quality metric to adjust the watermark embedding until a desired perceptual quality of the watermarked signal is attained.

16. A computer readable storage medium on which is stored instructions for performing a method of digitally watermarking a signal, the method comprising:

passing a reference signal and a watermarked signal through a model of an output device to produce a modeled reference signal and a modeled watermarked signal, the reference signal comprising a version of the watermarked signal prior to being watermarked to form the watermarked signal;

passing the modeled reference signal and the modeled watermarked signal to a perceptual quality metric that computes a measure of perceptual quality of the modeled watermarked signal based on a perceptual quality analysis of the modeled watermarked signal relative to the modeled reference signal; and using the output of the quality metric to adjust watermark embedding to achieve a desired perceptual quality in a watermarked signal.

* * * * *